United States Patent
Wellner et al.

(10) Patent No.: US 6,219,412 B1
(45) Date of Patent: Apr. 17, 2001

(54) CHOICE OF GUARANTEED VS. BUMPABLE CONFERENCE CALL RESERVATIONS

(75) Inventors: Pierre D. Wellner, Middletown, NJ (US); Stephen T. Dacek, Rockville Centre, NY (US); Arthur A. Goikhman, Marlboro; Cary T. Torkelson, Allendale, both of NJ (US)

(73) Assignee: Spiderphone.com, Inc., Middletown, NJ (US)

(*) Notice: Subject to any disclaimer, the term of this patent is extended or adjusted under 35 U.S.C. 154(b) by 0 days.

(21) Appl. No.: 09/575,430

(22) Filed: May 22, 2000

Related U.S. Application Data
(60) Provisional application No. 60/132,573, filed on May 5, 1999.

(51) Int. Cl.[7] .................................................. H04M 3/42
(52) U.S. Cl. ........................ 379/202; 379/203; 370/260
(58) Field of Search ................................. 379/202, 203, 379/204, 205, 206; 370/260, 261, 262, 263, 264, 265, 266, 267, 268, 269

(56) References Cited

U.S. PATENT DOCUMENTS

| | | | |
|---|---|---|---|
| 4,544,804 | * 10/1985 | Herr et al. ............................ | 379/204 |
| 4,550,224 | * 10/1985 | Winchell .............................. | 379/202 |
| 5,099,510 | * 3/1992 | Blinken, Jr. et al. ................ | 379/202 |
| 5,408,526 | 4/1995 | McFarland et al. .................. | 379/202 |
| 5,581,607 | 12/1996 | Richardson et al. ............. | 379/88.22 |
| 5,809,110 | 9/1998 | Ulrich et al. ........................... | 379/30 |
| 5,828,743 | * 10/1998 | Pinnell et al. ....................... | 379/204 |
| 5,844,973 | 12/1998 | Venkatraman et al. .............. | 379/127 |
| 5,978,463 | * 11/1999 | Jurkevics et al. .................... | 379/202 |
| 5,995,608 | * 11/1999 | Detampel, Jr. et al. ............. | 379/205 |

\* cited by examiner

Primary Examiner—Ahmad Matar
Assistant Examiner—Benny Q. Tieu
(74) Attorney, Agent, or Firm—Irwin Ostroff; Robert B. Ardis

(57) ABSTRACT

Participants in a pre-planned conference call are permitted to make reservations for ports on a conference bridge that are either guaranteed or bumpable. Guaranteed reservations are fulfilled regardless of subsequent requests for conference bridge space, while bumpable reservations are fulfilled only if subsequent requests for guaranteed conference bridge space do not require use of the same conference bridge ports. Specifically, in a telecommunications conferencing system taking the form of a conference bridge having n ports, where n is an integer greater than unity, and a system database, a non-guaranteed reservation request is received for a total of p ports for use during times which include a specified period of time, where p is an integer equal to or less than n, the requested ports are assigned, a guaranteed reservation request is received for a total of x ports for use during times which include at least part of the specified period of time, where x is an integer equal to or less than n and (x+p) is greater than n, and enough of the p ports from the non-guaranteed reservation are dropped during the part of the specified period of time to accommodate the guaranteed reservation request, so that (x+p) is no longer greater than n.

8 Claims, 7 Drawing Sheets

View Reservations By Account

All times are shown in the following time zone: Eastern

| Date | Time | Duration | Lines | Class |
|---|---|---|---|---|
| Monday, April 26, 1999 | 4:09:36 PM | 1 Hours | 3 | Free, Not Guaranteed |
| Monday, April 26, 1999 | 5:25:00 PM | 1 Hours | 4 | Guaranteed |
| Monday, April 26, 1999 | 6:02:31 PM | 1 Hours | 5 | Guaranteed |
| Tuesday, April 27, 1999 | 9:50:28 AM | 1 Hours | 4 | Guaranteed |
| Wednesday, April 28, 1999 | 2:20:00 PM | 1 Hours | 5 | Guaranteed |
| Wednesday, April 28, 1999 | 3:20:00 PM | 1 Hours | 5 | Guaranteed |
| Wednesday, April 28, 1999 | 11:19:54 PM | 1 Hours | 2 | Guaranteed |
| Thursday, April 29, 1999 | 11:50:00 AM | 1 Hours | 3 | Free, Not Guaranteed |
| Thursday, April 29, 1999 | 12:35:45 PM | 1 Hours | 5 | Guaranteed |

Click on the date to see more details for a particular reservation.

CHOICE OF GUARANTEED VS. BUMPABLE CONFERENCE CALL RESERVATIONS

CROSS REFERENCE TO RELATED APPLICATIONS

This application is related to and drawn from Provisional Application Ser. No. 60/132,573, filed May 5, 1999, having the same title as the present application and the same inventors and assignee. It is also related to application Ser. No. 09/449,463, filed Nov. 27, 1999, having the title "Active Talker Display for Web-Based Control of Conference Calls," and the same inventors and assignee as the present application.

FIELD OF THE INVENTION

This invention relates generally to telecommunications conferencing and, more particularly, to telecommunications conferencing in which reservations are made for conference call ports at particular times and dates.

BACKGROUND OF THE INVENTION

A conference call reservation represents a promise by the conference call service provider to make a specific number of conference bridge ports available at a certain time and date for a specific amount of time. Conference call bridge capacity is not unlimited, however, and demand for it can be very uneven. For example, many more people are likely to want to call at 10:00 A.M. Monday than at 4:00 A.M. Sunday. To ensure that bridge capacity will be available, conference call service companies usually require that the conference call organizer or host make a reservation. This reservation is typically stored as a record in a database and includes date, time, number of conference bridge ports, and duration, along with such other information as account number and access codes.

Reservations are normally made on a first-come first-served basis. If a conference bridge has only 100 ports available and someone makes a reservation for 90 ports for one hour at 10:00 A.M. Monday, the next person seeking to make a reservation will not be able to reserve 50 ports for the same period of time. Some conference call service providers overbook their bridges, so they may allow, for example, a total of 110 ports to be reserved on a 100 port bridge because they expect the conferences to use fewer ports than have been reserved. If, in fact, more ports are needed than physically available, then the conference call company fails to live up to its promise. Customers can be unhappy in this instance and may seek to be compensated.

SUMMARY OF THE INVENTION

From one aspect, the invention is directed to a telecommunications conferencing system. The system comprises (1) a conference bridge having n ports, where n is an integer greater than unity, and a system database; (2) means for receiving at least one non-guaranteed reservation request for a total of p ports for use during times which include a specified period of time, where p is an integer equal to or less than n; (3) means for assigning the requested ports in response to the non-guaranteed reservation; (4) means for receiving at least one guaranteed reservation request for a total of x ports for use during times which include at least part of the specified period of time, where x is an integer equal to or less than n and (x+p) is greater than n; and (5) means for dropping a sufficient number of the p ports from the non-guaranteed reservation during the part of the specified period of time to accommodate the guaranteed reservation request, so that (x+p) is no longer greater than n.

From a related aspect of the invention, least some potential users of the telecommunications conferencing system are offered a choice between guaranteed and non-guaranteed reservations.

From another aspect of the invention, at least some non-guaranteed reservations are dropped prior to the specified period of time for which they were made.

From still another aspect of the invention, at least some non-guaranteed reservations are dropped during the specified period of time for which they were made.

From another aspect, the invention is directed to a method of operating a telecommunications conferencing system which includes a conference bridge having n ports, where n is an integer greater than unity, and a system database. The method comprises the steps of (1) receiving at least one non-guaranteed reservation request for a total of p ports for use during times which include a specified period of time, where p is an integer equal to or less than n; assigning the requested ports in response to the non-guaranteed reservation; (2) receiving at least one guaranteed reservation request for a total of x ports for use during times which include at least part of the specified period of time, where x is an integer equal to or less than n and (x+p) is greater than n; and (3) dropping enough of the p ports from the non-guaranteed reservation during the part of the specified period of time to accommodate the guaranteed reservation request, so that (x+p) is no longer greater than n.

From a related aspect of the invention, the method offers at least some potential users a choice between guaranteed and non-guaranteed reservations.

From another aspect of the invention, the method drops at least some non-guaranteed reservations prior to the specified period of time for which they were made.

From still another aspect of the invention, the method drops at least some non-guaranteed reservations during the specified period of time for which they were made.

The invention may be more fully understood from the following detailed description of a specific implementation, taken in the light of the accompanying drawings and the appended claims.

DETAILED DESCRIPTION

The present invention takes the form of a conference call reservation system and a method of operating the same which not only offers conventional guaranteed reservations but also offers bumpable reservations that are not guaranteed. In other words, instead of overbooking by making promises that might not be able to be honored, the invention provides a way to offer classes of conference call reservation service that are explicitly not guaranteed in addition to the usual classes of conference call reservation service that are guaranteed. Reservations that are not guaranteed (i.e., bumpable reservations) may be priced lower than guaranteed reservations or may even be offered free of charge as a business promotion.

If the entire capacity of the system is reserved at a particular time, but some part of this capacity is reserved with bumpable reservations, it is still possible to offer higher-priced guaranteed reservations that can take the place of lower-priced (or free) bumpable reservations. In this instance, holders of the bumpable reservations will be bumped and not be able to make their conference calls.

A non-guaranteed reservation may be bumped either before the conference was scheduled to begin, or after it has already started. If it is bumped before conference start time, then when customers dial in to start the conference call, they will hear an announcement informing them that their reservation has been bumped.

If a bumpable conference has already begun and someone else wants immediately to start a guaranteed (higher-priced) conference, the guaranteed conference may be allowed to proceed by hanging up as many bumpable ports as necessary to free up the required capacity. Before doing this, an announcement is preferably played to all participants of a bumpable conference warning them that, if they do not voluntarily hang up a designated number lines within a certain amount of time, the system will automatically select that number of lines to hang up itself.

In combination with the bumpable distinction, a separately priced conference reservation class may also be distinguished from other classes by additional restrictions such as maximum number of ports, maximum duration, and time of day available.

Figure 1:
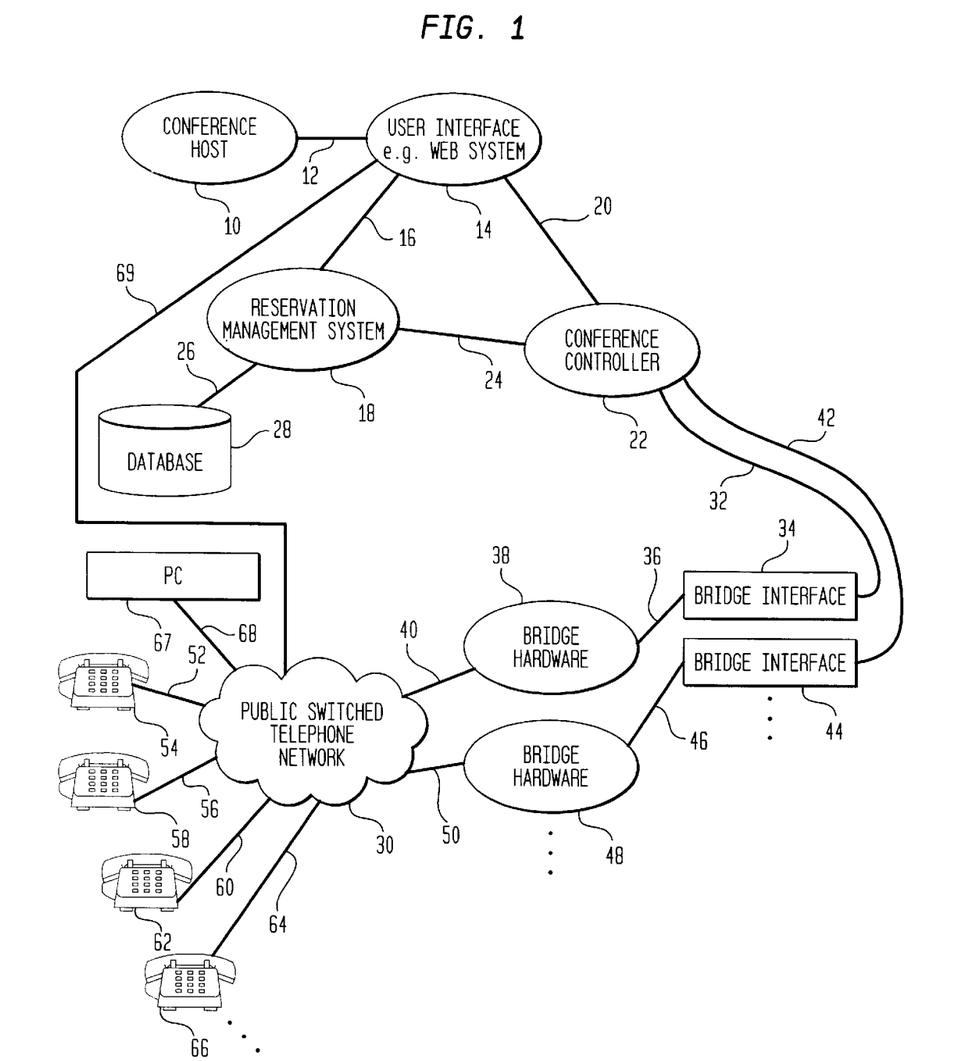
FIG. 1 is a block diagram showing the general system architecture utilized by the invention.

An example of the general architecture used for practicing the invention is illustrated in FIG. 1. As shown, a conference host 10 is connected by way of a suitable transmission facility 12 (e.g., a dial-up facility) to a user interface 14 (typically a web system such as the World Wide Web associated with the Internet). User interface 14 is connected by way of a transmission facility 16 to a computer-based reservation management system 18 and by way of a transmission facility 20 to a computer-based conference controller 22. Reservation management system 18 and conference controller 22 are connected to one another by way of a transmission facility 24. Reservation management system 18 is also connected by way of a transmission facility 26 to a database 28.

For simplicity, only two paths from conference controller 22 to the public switched telephone network 30 are shown, although multiple additional paths may be employed as well. In one, a transmission facility 32 connects conference controller 22 to a bridge interface 34, a transmission facility 36 connects bridge interface 34 to bridge hardware 36, and a transmission facility 40 connects bridge hardware 36 to the public switched telephone network 30. In the other, a transmission facility 42 connects conference controller 22 to a bridge interface 44, a transmission facility 46 connects bridge interface 44 to bridge hardware 48, and a transmission facility 50 connects bridge hardware 48 to the public switched telephone network 30.

From the public switched telephone network 30, a transmission facility 52 is connected to a user telephone set 54, a transmission facility 56 is connected to a user telephone set 58, a transmission facility 60 is connected to a user telephone set 62, and a transmission facility 64 is connected to a user telephone set 66. Transmission facilities 52, 56, 60, and 64 and user telephone sets 54, 58, 62, and 66 may be replicated as much as necessary, depending upon the number of participants in any conference call. A respective personal computer (PC) may be associated with any of user telephone sets 54, 58, 62, and 66 (and as many additional user telephone sets as necessary). connected to user interface 14 through the public switched telephone network 30. By way of example, a single PC 67 is associated with user telephone set 54 and connected to the public switched telephone network 30 by way of a suitable transmission facility 68. The public switched telephone network 30 is connected to user interface 14 by way of a suitable transmission facility 69.

Figure 2:
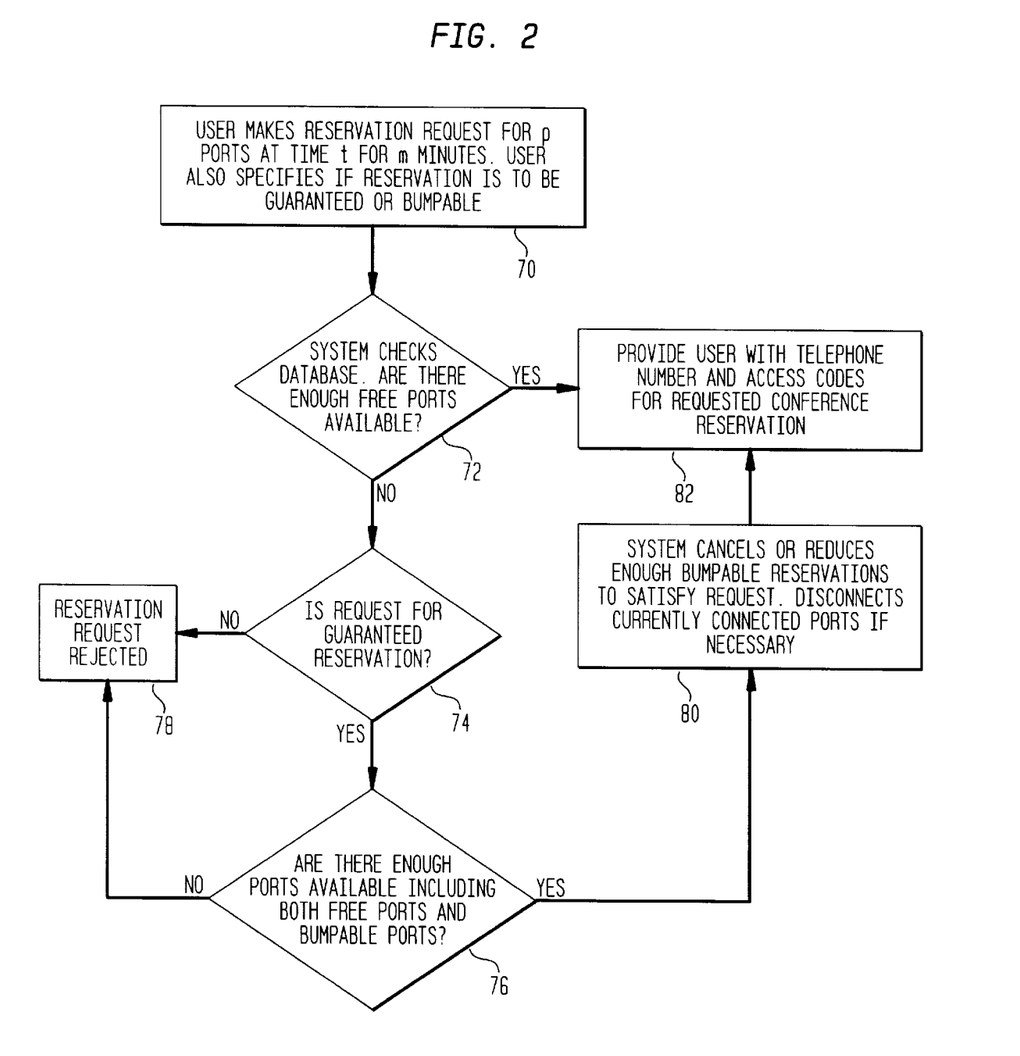
FIG. 2 is a flow chart illustrating operation of both system and method aspects of the invention.

The flow of control for a conference call system that provides a choice of guaranteed vs. bumpable reservations in accordance with the invention is illustrated in block diagram form in FIG. 2. In a step 70, a user makes a reservation request for p ports at time t for m minutes, also specifying if the reservation is to be guaranteed or bumpable. In a step 72, the system checks its database to determine whether enough free ports are available. If the answer to step 72 is no, a step 74 checks to see if the request is for a guaranteed reservation.

If the answer to step 74 is yes, step a 76 checks to see if there are enough ports available, including both free ports and bumpable ports. If the answer to step 74 is no, a step 78 rejects the request.

If the answer to step 76 is no, step 78 rejects the request. If the answer to step 76 is yes, a step 80 cancels or reduces enough bumpable reservations to satisfy the request, disconnecting currently connected ports if necessary. A step 82 then provides the requesting user with telephone number and access codes for the requested conference reservation. If the answer to step 72 is yes, the process moves directly to step 82, which provides the requesting user with telephone number and access codes for the requested conference reservation.

By way of recapitulation, the following sequence of events takes place at reservation time:

(1) A customer decides to make a conference call reservation and is prompted for the date, time, number of ports, call duration, and payment information. In addition to this standard information, the user is then asked to select between a guaranteed reservation or bumpable non-guaranteed reservation. These two classes of service will be offered at different prices. Bumpable reservations may be free of charge, or may be charged for only if they are not used in order to ensure serious reservations only. There may be more than two classes of reservation to select from, because in addition to the guaranteed/bumpable distinction, classes may have additional restrictions such as maximum number of ports, available features, or date/time restrictions.

(2) The system looks for the requested reservation parameters in its database and determines whether or not the requested resources are available.

(3) If the requested resources are available, the system provides the customer with one or more telephone numbers and access codes that can be used at the scheduled time to start and/or join the conference. If the entire conference bridge capacity is reserved at the requested time with a combination of bumpable and guaranteed reservations then if the user requests a bumpable reservation, the system will reject this request. If the user requests a guaranteed reservation, the system will bump (i.e., invalidate) as many ports as necessary to meet the guaranteed reservation request, but only by bumping ports from non-guaranteed reservations. If there are not enough bumpable ports available to meet the guaranteed reservation request, then the request is rejected.

(4) The system selects the smallest possible reservation(s) to be bumped in order to make room for a guaranteed reservation. The system may cancel any number of bumpable conferences entirely, take small numbers of ports away from multiple bumpable reservations, or shorten the duration of bumpable reservations.

In addition to limits on the number of conference bridges and number of ports available, the system may also place limits on certain classes of reservations. For example, the system may limit the number of ports available to a bumpable class of reservations regardless of whether the capacity has already been reserved by guaranteed reservations or not, or the system may place limits on the number of bumpable ports available at any particular time.

The following is a summary of what happens at conference start time:

At the time when a reserved conference is scheduled to begin, the conference normally starts when the first participant calls in to the designated phone number and keys in the access code assigned to this reservation, or "clicks in" from the web and supplies the same access code. If the reservation was bumpable, however, and its resources were assigned to a guaranteed reservation, then the bumped conference call is not allowed to start and instead all participants receive a message (by web or phone) informing them that their conference has been bumped. If sufficient bumpable resources are still available at this time, participants may be offered the option of changing this bumpable reservation to a guaranteed reservation and pay the difference in price.

If there are enough resources available for the bumpable conference to begin at start time, then the conference is allowed to start normally.

The following is a summary of what happens during a conference:

After a guaranteed conference has started, it is allowed to proceed until all participants hang up. A bumpable conference, on the other hand, may be interrupted to allow a guaranteed conference to start. This could happen for either of two reasons. (1) A new reservation for a guaranteed conference may arrive requesting to begin immediately, and there is no unused capacity available, or (2) The bumpable reservation was shortened in order to allow a guaranteed reservation to start.

If ports need to be confiscated from a currently running bumpable conference, an announcement can be played to all participants in the conference stating the number of ports they need to hang up. If participants hang up voluntarily, these ports are made available to the guaranteed reservation, otherwise the system forcibly hangs up the required number of ports, and may terminate the entire non-guaranteed conference call. Any number of known algorithms may be used to determine the order in which ports are hung up. The system may hang them up in reverse of the order in which they joined the conference, for example, or it may hang up ports based on how active each port has been, hanging up first the ports that have talked least.

If the system is operating well below capacity, it may never be necessary to bump a conference, and bumpable reservations may effectively offer the same level of service as guaranteed reservations. If bumpable conferences are offered at no charge, the service provider may wish to encourage more use of guaranteed reservations in order to gain more revenue. One way to offer this encouragement is to bump a certain number of bumpable conferences at random, even if their capacity is not required. A certain percentage of ports may be randomly bumped at reservation time, conference start time, or during an active conference.

The disclosed technique for offering a choice of guaranteed versus bumpable conference reservations is especially valuable in instances where the incremental variable cost of providing the service is close to zero, i.e., where a certain amount of capacity is already paid for and in place and there is no additional cost for incoming calls. In addition to voice telephone conference calls, the technique can also be applied to video-based conferencing and Internet-based conferencing.

Figure 3:
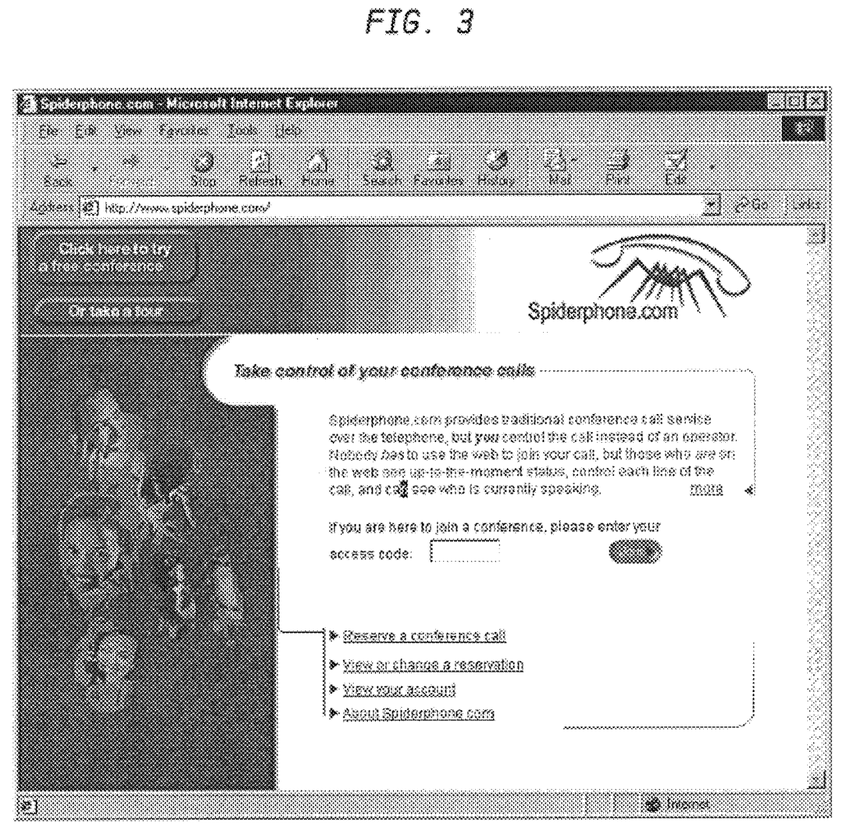
FIG. 3 is a video monitor display screen shot illustrating an example of an Internet home web page of a conference call service provider making use of the invention.

FIG. 3 is a screen shot of an example of a service provider's home Internet web page. Such a home page, for example, includes means for entering an access code and means for beginning the process of reserving a conference call.

Figure 4:
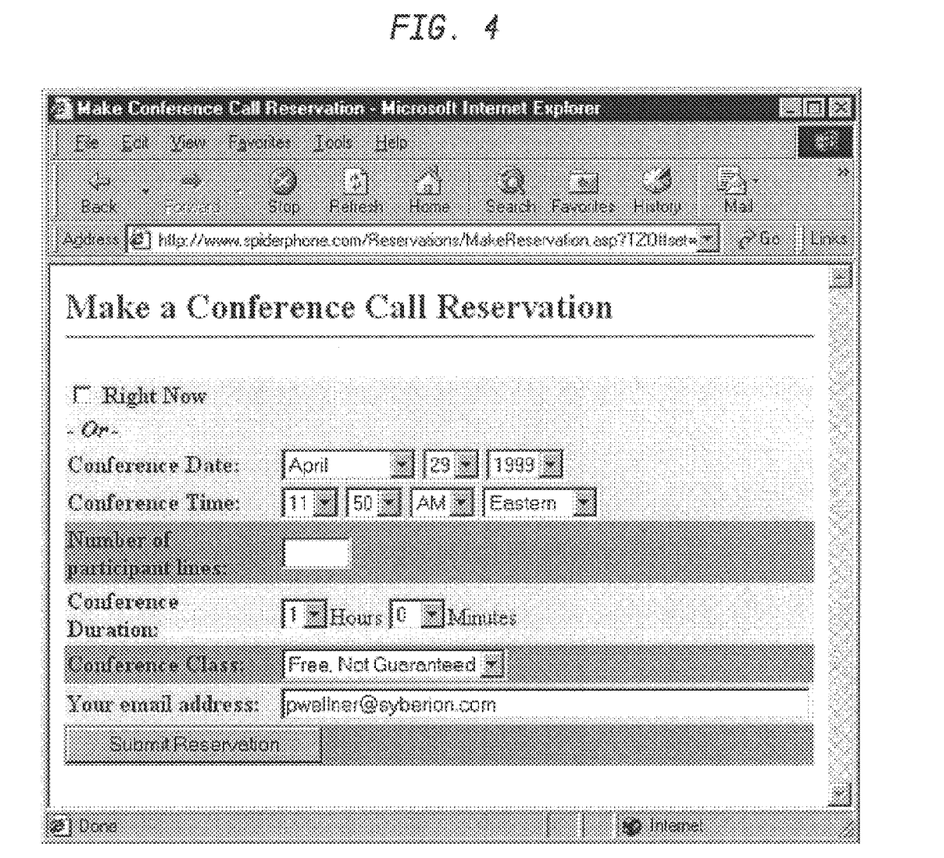
FIG. 4 is a video monitor display screen shot illustrating an example of what a user sees when making a conference call reservation in accordance with the invention.

FIG. 4 is a screen shot of an Internet web page for making a conference call reservation. In addition to the usual choices of date, time, and number of lines, the user also has a choice of "Conference Class" where one of the choices is "Free, Not Guaranteed" and the other is "Guaranteed."

Figure 5:
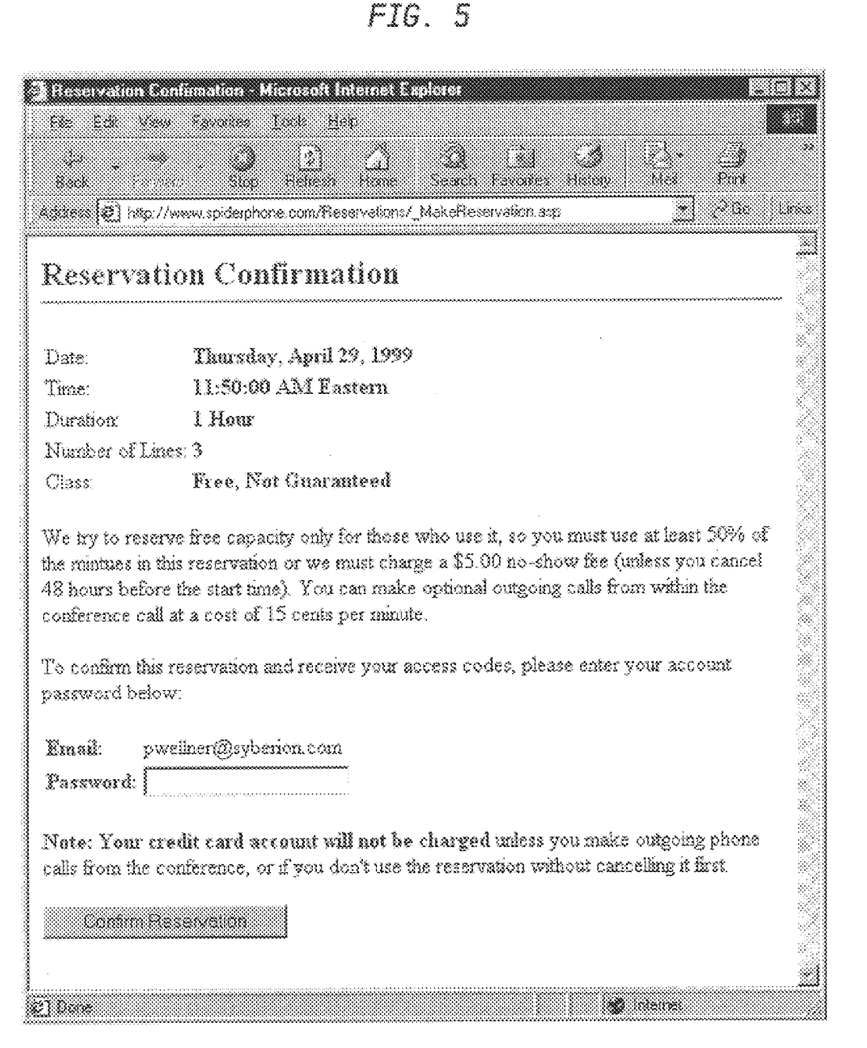
FIG. 5 is a video monitor display screen shot illustrating an example of what a user sees when confirming a conference call reservation in accordance with the invention.

FIG. 5 is a screen shot of a reservation confirmation request web page. This page explains the fine print before asking the user to confirm the reservation.

Figure 6:
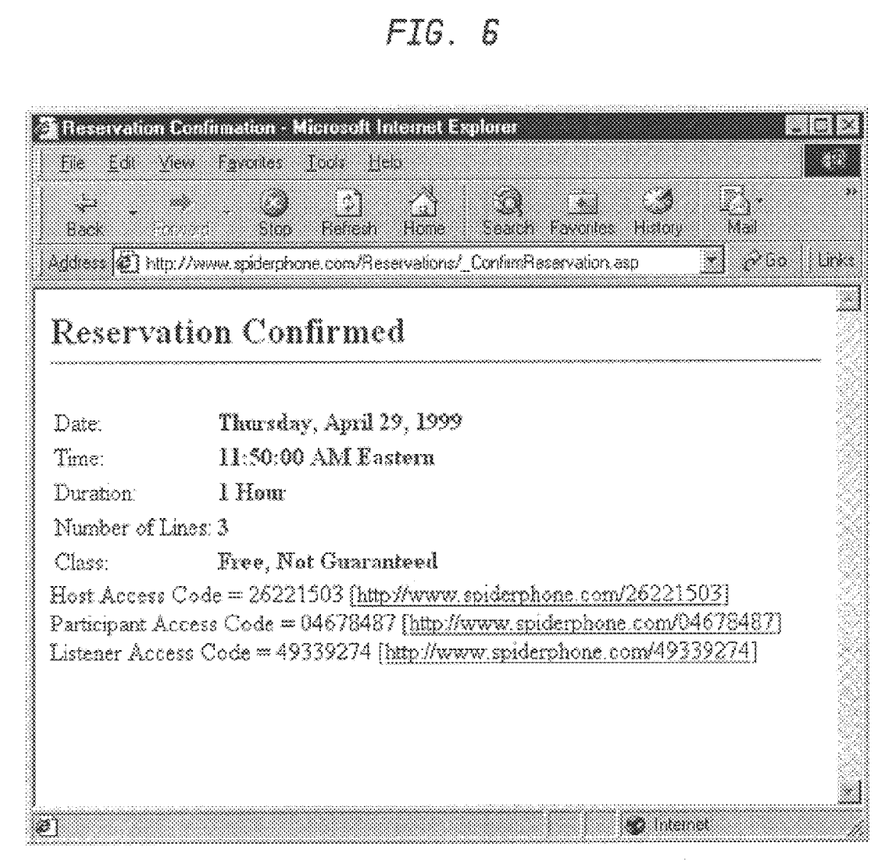
FIG. 6 is a video monitor display screen shot illustrating an example of what a user sees after confirmation of a conference call reservation in accordance with the invention.

FIG. 6 is a screen shot of a "reservation confirmed" web page. This page gives the user access codes to get into the conference. All access codes join the same conference, but some access codes may have more privileges than others. URLs (uniform resource locators—the addresses of resources accessible on the Internet) include access codes so that user does not have to enter them manually in order to join conference on the web.

Figure 7:
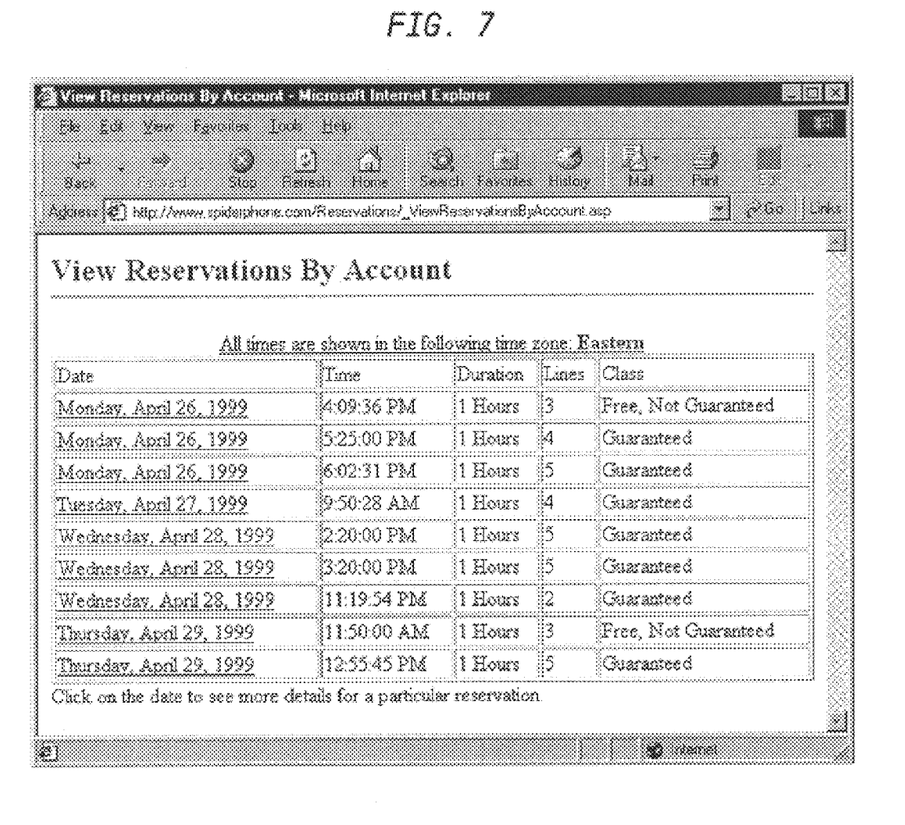
FIG. 7 is a video monitor display screen shot illustrating an example of what a user sees when requesting to view or change a conference call reservation in accordance with the invention.

FIG. 7 is an example of the screen that appears showing information about each reservation that appears after pressing a "View or Change a Reservation" button and entering an account password. Clicking on the date shows more details, including the ability to cancel or modify a particular reservation. The time zone used to display reservations is the local time zone for the user's computer (U.S. Eastern in illustrated example). If the user's computer is in a different time zone, all times are adjusted accordingly.

It is to be understood that the specific implementation of the invention which has been described is illustrative. Numerous other arrangements and modifications may be readily devised by those skilled in the art without departing from the spirit and scope of the invention.

What is claimed is:

1. In a telecommunications conferencing system which includes a conference bridge having n ports, where n is an integer greater than unity, and a system database, a method of operation comprising the steps of:

receiving at least one non-guaranteed reservation request for a total of p ports for use during times which include a specified period of time, where p is an integer equal to or less than n;

assigning the requested ports in response to said non-guaranteed reservation;

receiving at least one guaranteed reservation request for a total of x ports for use during times which include at least part of said specified period of time, where x is an integer equal to or less than n and (x+p) is greater than n; and dropping a sufficient number of said p ports from said non-guaranteed reservation during said part of said specified period of time to accommodate said guaranteed reservation request, so that (x+p) is no longer greater than n.

2. The method of claim 1 in which at least some potential users are offered a choice between guaranteed and non-guaranteed reservations.

3. The method of claim 1 in which at least some non-guaranteed reservations are dropped prior to the specified period of time for which they have been made.

4. The method of claim 1 in which at least some non-guaranteed reservations are dropped during the specified period of time for which they have been made.

5. A telecommunications conferencing system comprising:

a conference bridge having n ports, where n is an integer greater than unity, and a system database;

means for receiving at least one non-guaranteed reservation request for a total of p ports for use during times which include a specified period of time, where p is an integer equal to or less than n;

means for assigning the requested ports in response to said non-guaranteed reservation;

means for receiving at least one guaranteed reservation request for a total of x ports for use during times which include at least part of said specified period of time, where x is an integer equal to or less than n and (x+p) is greater than n; and means for dropping enough of said p ports from said non-guaranteed reservation during said part of said specified period of time to accommodate said guaranteed reservation request, so that (x+p) is no longer greater than n.

6. The conferencing system of claim 5 in which at least some potential users are offered a choice between guaranteed and non-guaranteed reservations.

7. The conferencing system of claim 5 in which at least some non-guaranteed reservations are dropped prior to the specified period of time for which they have been made.

8. The conferencing system of claim 5 in which at least some non-guaranteed reservations are dropped during the specified period of time for which they have been made.

* * * * *